United States Patent
Chang

[11] Patent Number: 5,967,537
[45] Date of Patent: Oct. 19, 1999

[54] CHAINLESS TRANSMISSION MECHANISM FOR A BICYCLE

[76] Inventor: Chen-Ching Chang, 3/F., No. 37, Jih-Hsin St., Shu-Lin Town, Taipei County, Taiwan

[21] Appl. No.: 08/824,191

[22] Filed: Mar. 25, 1997

[51] Int. Cl.[6] .................................................. B62M 1/02
[52] U.S. Cl. ...................... 280/259; 280/260; 280/274; 74/417
[58] Field of Search ................................... 280/259, 260, 280/274, 281.1, 236, 238; 180/226; 74/417

[56] References Cited

U.S. PATENT DOCUMENTS

| | | | |
|---|---|---|---|
| 3,861,715 | 1/1975 | Mendoza | 280/260 |
| 4,943,077 | 7/1990 | Lin et al. | 280/260 |
| 5,299,819 | 4/1994 | Leu | 280/260 |
| 5,316,327 | 5/1994 | Bell | 280/260 |
| 5,482,306 | 1/1996 | Hsu | 280/259 |
| 5,852,948 | 12/1998 | Chang | 74/417 |

*Primary Examiner*—Paul N. Dickson
*Assistant Examiner*—Lynda Jasmin
*Attorney, Agent, or Firm*—Rosenberg, Klein & Bilker

[57] ABSTRACT

A chainless transmission mechanism for a bicycle, including a casing mounted in a bottom bracket to hold a bottom bracket bearing axle, permitting the bottom bracket bearing axle to be driven by pedals to turn a rear-wheel hub through a transmission shaft and two transmission gear sets, wherein the bottom bracket has a first end, a second end, and a notch at the second end thereof; the casing is a cylindrical shell inserted through the bottom bracket, having a first end secured to the bottom bracket outside the first end of the bottom bracket by a clamp, a second end disposed outside the second end of the bottom bracket, and a hollow projecting block raised from its second end and forced into engagement with the notch at the second end of the bottom bracket.

1 Claim, 7 Drawing Sheets

CHAINLESS TRANSMISSION MECHANISM FOR A BICYCLE

BACKGROUND OF THE INVENTION

The present invention relates to a chainless transmission mechanism for bicycle, and more particularly to an improved structure of chainless transmission mechanism which is easy to install and durable in use, and which achieves a high performance.

Various chainless transmission mechanisms have been disclosed for use in bicycles for transmitting the driving power of the pedals to the rear-wheel hub. FIGS. 1 and 1A show a chainless transmission mechanism for a bicycle according to the prior art. This structure of chainless transmission mechanism comprises an axle housing 10 having a coupling flange 11 at one side fixedly fastened to a bottom bracket 2 of a bicycle frame 1, an end cap 14 covered on the axle housing 10 to hold a bottom bracket bearing axle 12 in the axle housing 10, a drive gear 13 fixedly mounted on the axle 12, a driven gear 18 mounted on an axle 4 of a rear-wheel hub 3, a shell 17 secured to the rear-wheel hub 3 by a nut 19, a first stay 5 connected between the axle housing 10 and the shell 17, a second stay 6 connected between the axle housing 10 and the rear-wheel hub 3, a transmission shaft 7 mounted in the first stay 5, a first transmission gear 15 and a second transmission gear 16 fixedly mounted on two opposite ends of the transmission shaft 7 and respectively meshed with the drive gear 13 and the driven gear 18. This structure of chainless transmission mechanism has drawbacks. Because the coupling flange 11 of the axle housing 10 which is fixedly secured to the bottom bracket 2 of the bicycle frame 1 is disposed at one side of the axle housing 10, the connecting area between the bottom bracket 2 and the axle housing 10 tends to be forced to deform or to break. Another drawback of this structure of chainless transmission mechanism is the complicated processing procedure of the coupling flange 11 of the axle housing 10. Still another drawback of this structure of chainless transmission mechanism is that the driven gear 18 tends to be forced out of place because it is fastened to the axle 4 of the rear-wheel hub 3 by a screw joint. Furthermore, because the gears 13;15;16;18 are bevel gear wheels, driving power may be intermittently transmitted from the bottom bracket bearing axle 12 to the axle 4 of the rear-wheel hub 3. This problem become worse when the teeth start to wear.

FIGS. 2 and 2A show another structure of chainless transmission mechanism for a bicycle according to the prior art. This structure of chainless transmission mechanism is substantially similar to that shown in FIG. 1. According to this structure, the bottom bracket 21 is shaped like a barrel; the axle housing 20 is coupled to the bottom bracket 21 and secured in place by a cap 22, which is fastened to the axle housing 20 by screws 23; the driven gear 18 is fixedly secured to the axle 4 of the rear-wheel hub 3 by a tightening-up screw 8. This structure of chainless transmission mechanism still has drawbacks. One drawback of this structure of chainless transmission mechanism is that the connecting area between the axle housing 20 and the cap 22 tends to be forced to deform, thereby causing the axle housing 20 to displace from the bottom bracket 21. Another drawback of this structure of chainless transmission mechanism is that driving power cannot be efficiently transmitted from the pedals to the axle 4 of the rearwheel hub 3 because the gears 13;15;16;18 are bevel gears. Furthermore, the driven gear 18 may be forced out of place easily because the tightening-up screw 8 wears quickly with use.

SUMMARY OF THE INVENTION

The present invention has been accomplished to provide a chainless transmission mechanism which eliminates the aforesaid drawbacks. According to one aspect of the present invention, the chainless transmission mechanism comprises a casing mounted in a bottom bracket to hold a bottom bracket bearing axle, permitting the bottom bracket bearing axle to be driven by pedals to turn a rear-wheel hub through a transmission shaft and two transmission gear sets, wherein the bottom bracket has a first end, a second end, and a notch at the second end thereof; the casing is a cylindrical shell inserted through the bottom bracket, having a first end secured to the bottom bracket outside the first end of the bottom bracket by a clamp, a second end disposed outside the second end of the bottom bracket, and a hollow projecting block raised from the second end of the first casing and forced into engagement with the notch at the second end of the bottom bracket. According to another aspect of the present invention, a first helical gear and a second helical gear are respectively mounted on the bottom bracket bearing axle and the axle of the rear-wheel hub, and two helical spur gears are respectively mounted on two opposite ends of the transmission shaft and meshed with the first and second helical gears. According to still another aspect of the present invention, the rear-wheel hub has an outside annular coupling groove around an axle holder thereof, the second helical gear has an inside annular coupling groove matching with the outside annular groove of the rear-wheel hub and secured thereto by a binding ring.

BRIEF DESCRIPTION OF THE DRAWINGS

FIG. 1A is a sectional view taken along line A—A of FIG. 1;

FIG. 2A is a sectional assembly view of a part of FIG. 2, showing the bottom bracket and the cap fastened together;

FIG. 3A is a cutaway in an enlarged scale of a part of the second helical gear shown in FIG. 3;

DETAILED DESCRIPTION OF THE PREFERRED EMBODIMENT

Figure 1:
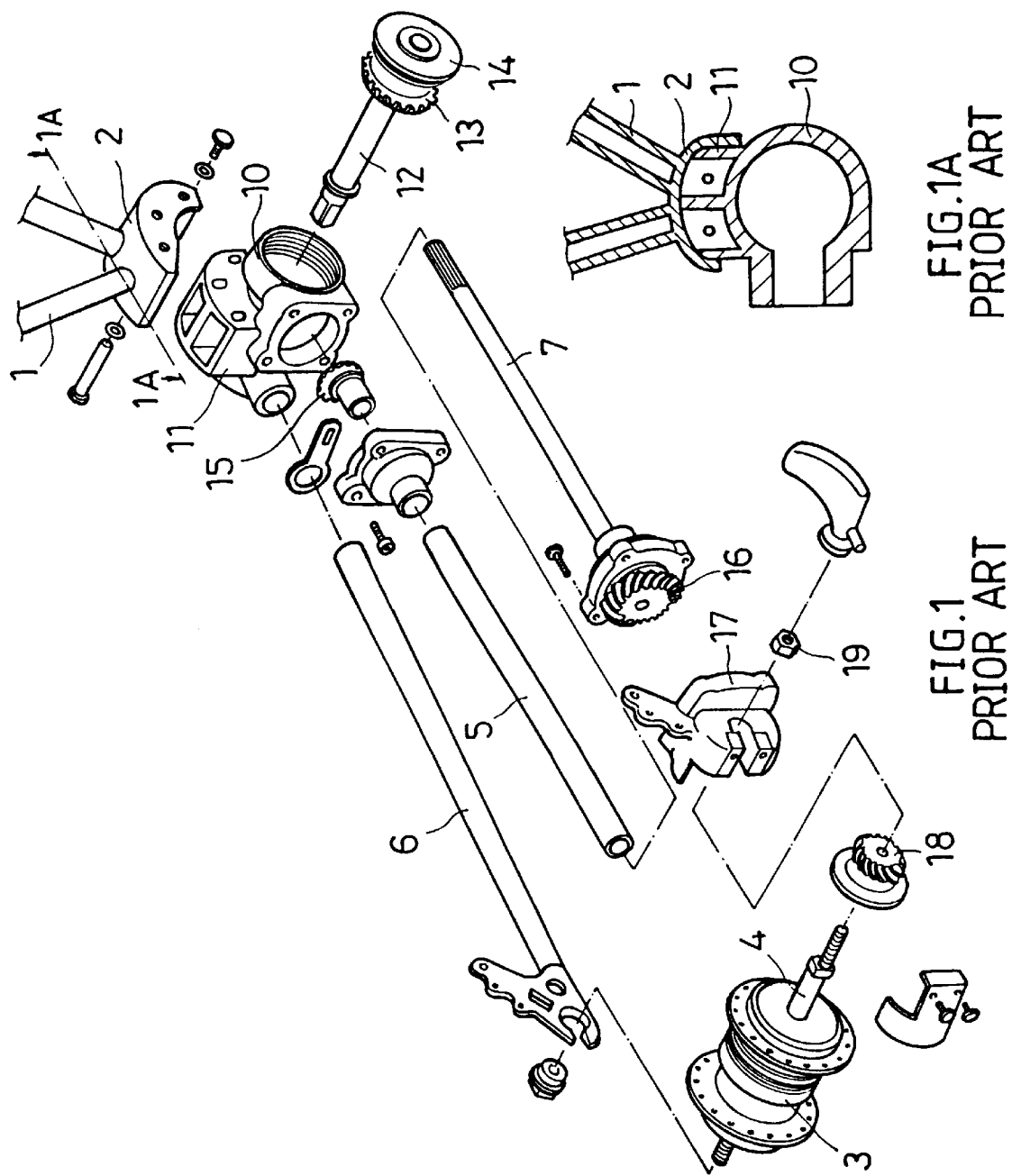
FIG. 1 is an exploded view of a chainless transmission mechanism for a bicycle according to the prior art.
Figure 2:
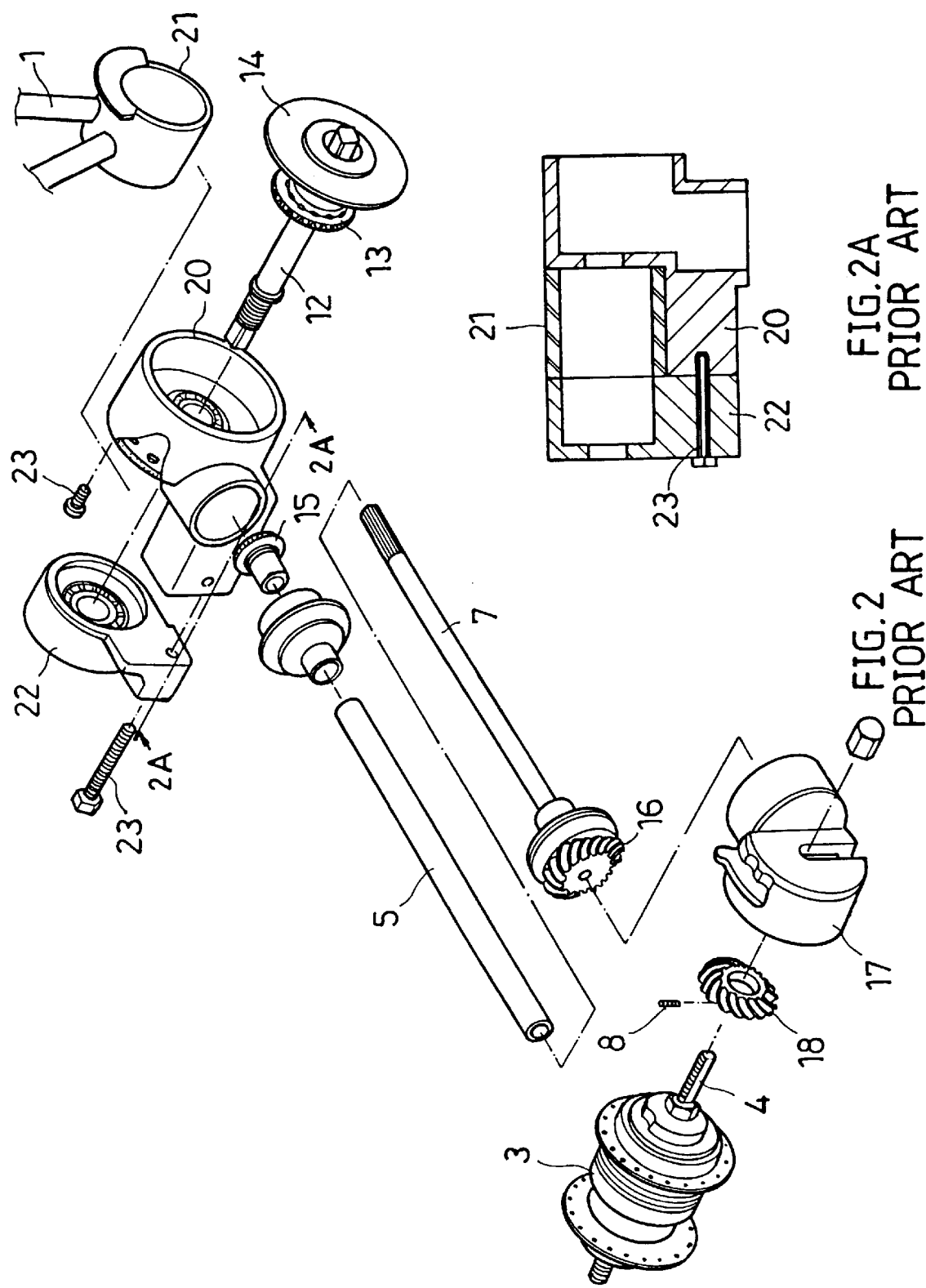
FIG. 2 is an exploded view of another structure of chainless transmission mechanism for a bicycle according to the prior art.
Figure 3:
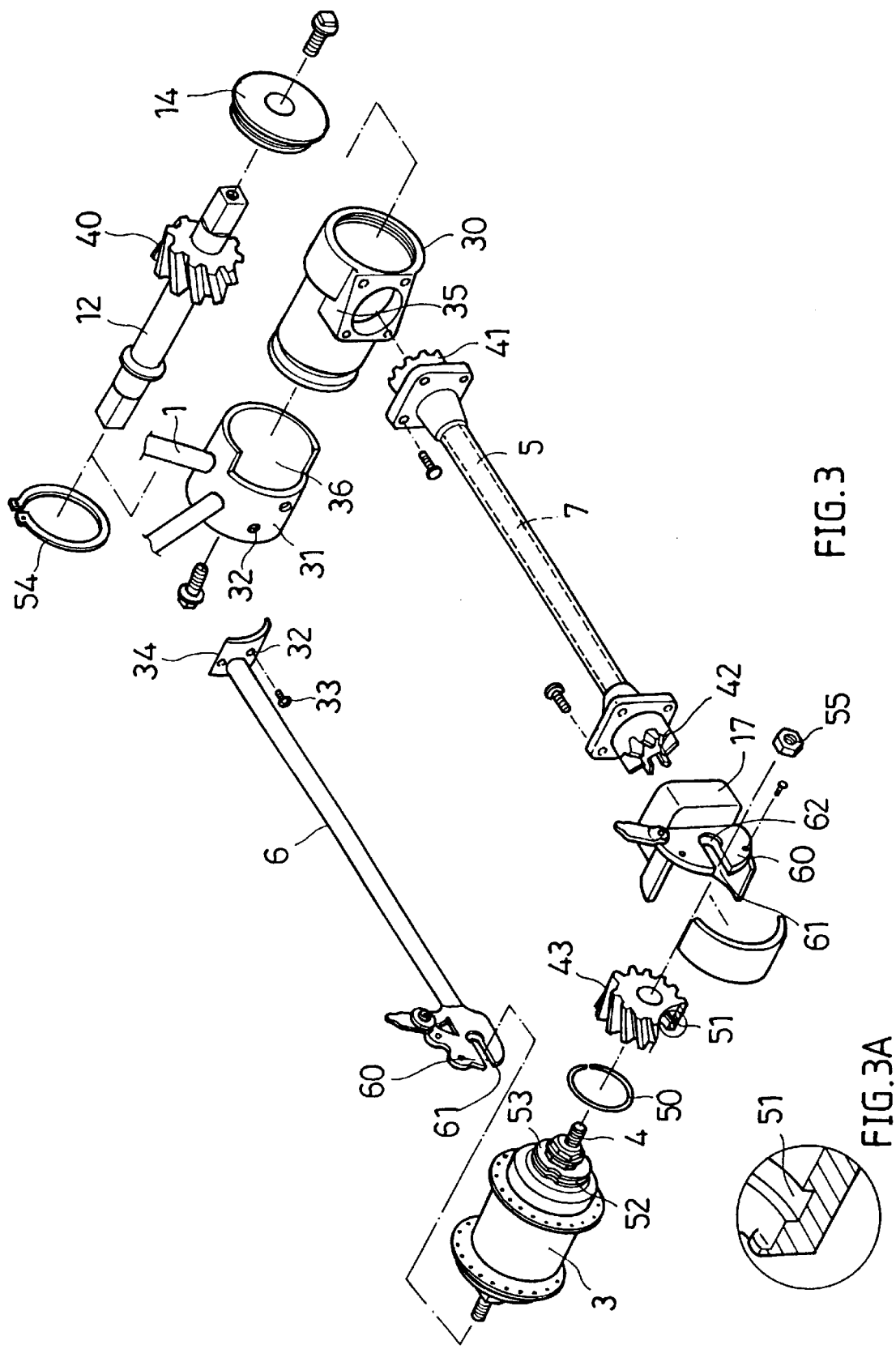
FIG. 3 is an exploded view of a chainless transmission mechanism for a bicycle according to the present invention.
Figure 4:
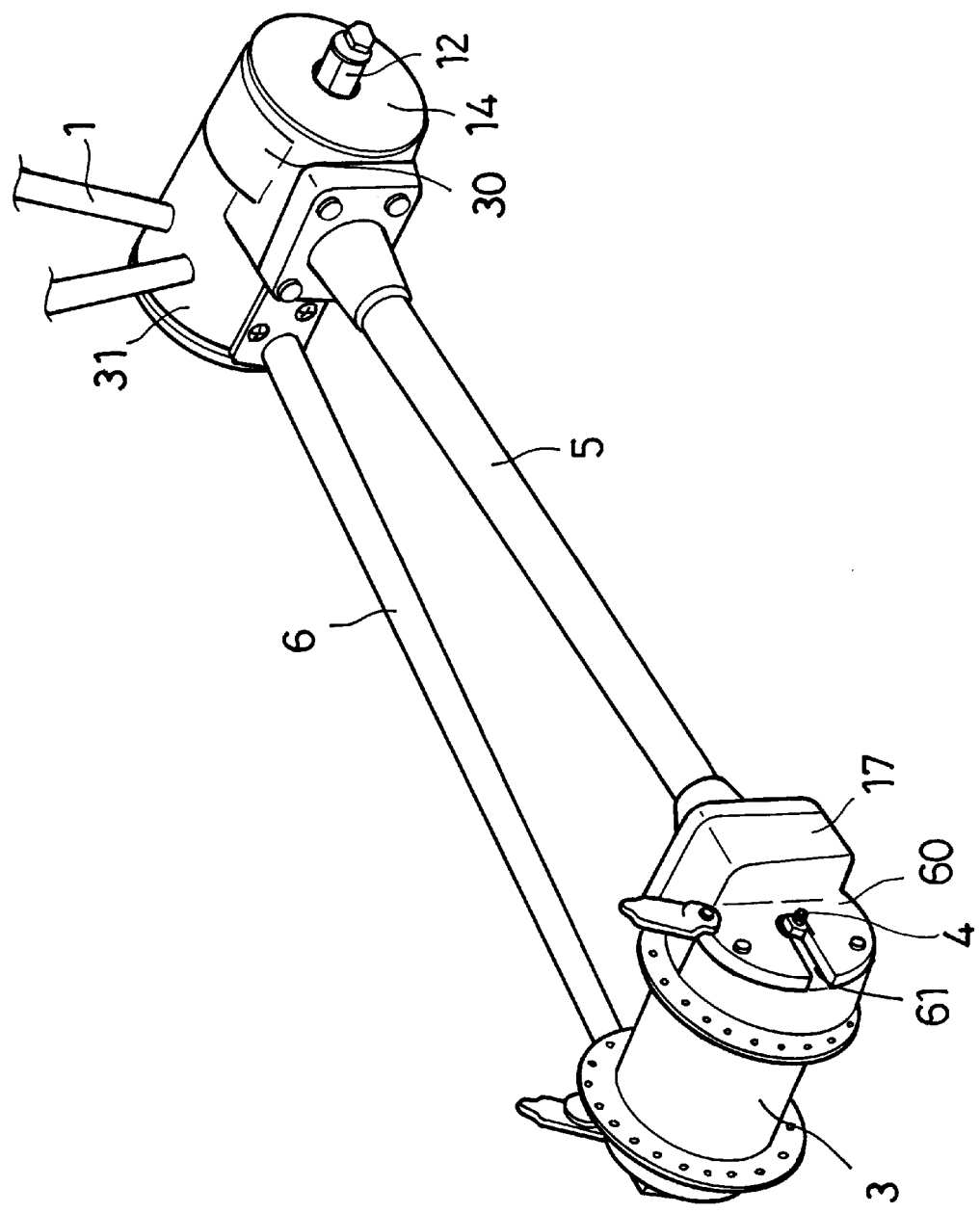
FIG. 4 is an assembly view of FIG. 3.

Referring to FIGS. 3 and 4, a first casing 30 is mounted in a bottom bracket 31 of a bicycle and covered with an end cap 14 to hold a bottom bracket bearing axle 12. A second casing 17 is fixedly fastened to a rear-wheel hub 3 around its axle 4. A first stay 5 is connected between the first casing 30 and the second casing 17. A second stay 6 is connected between the bottom bracket 31 and the rear-wheel hub 3. A transmission shaft 7 mounted in the first stay 5 and coupled between the bottom bracket bearing axle 12 and the axle 4 of the rear-wheel hub 3.

Figure 5:
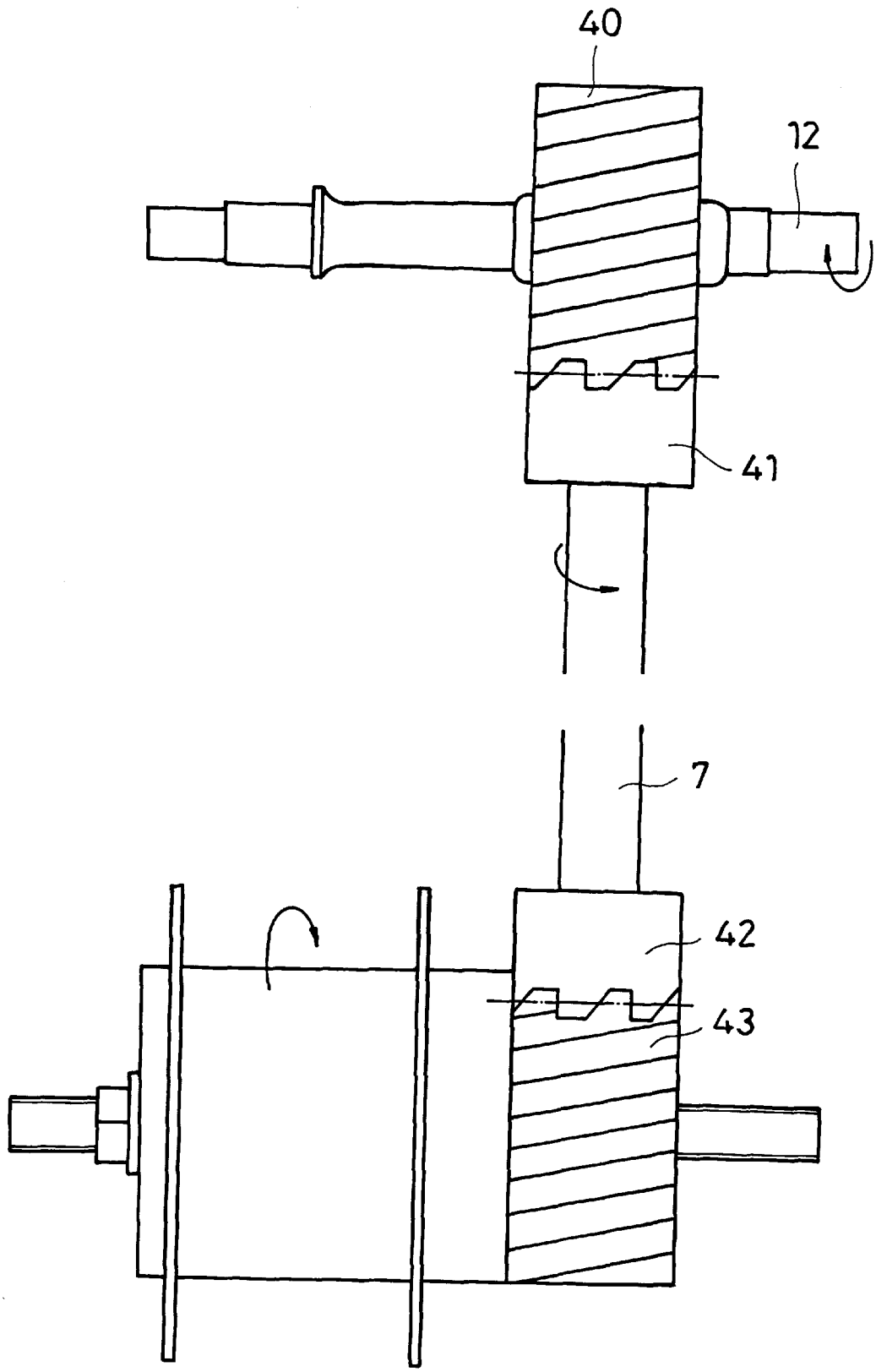
FIG. 5 is a schematic drawing showing the turning directions of the bottom bracket bearing axle, the transmission shaft and the rear-wheel hub according to the present invention.
Figure 6:
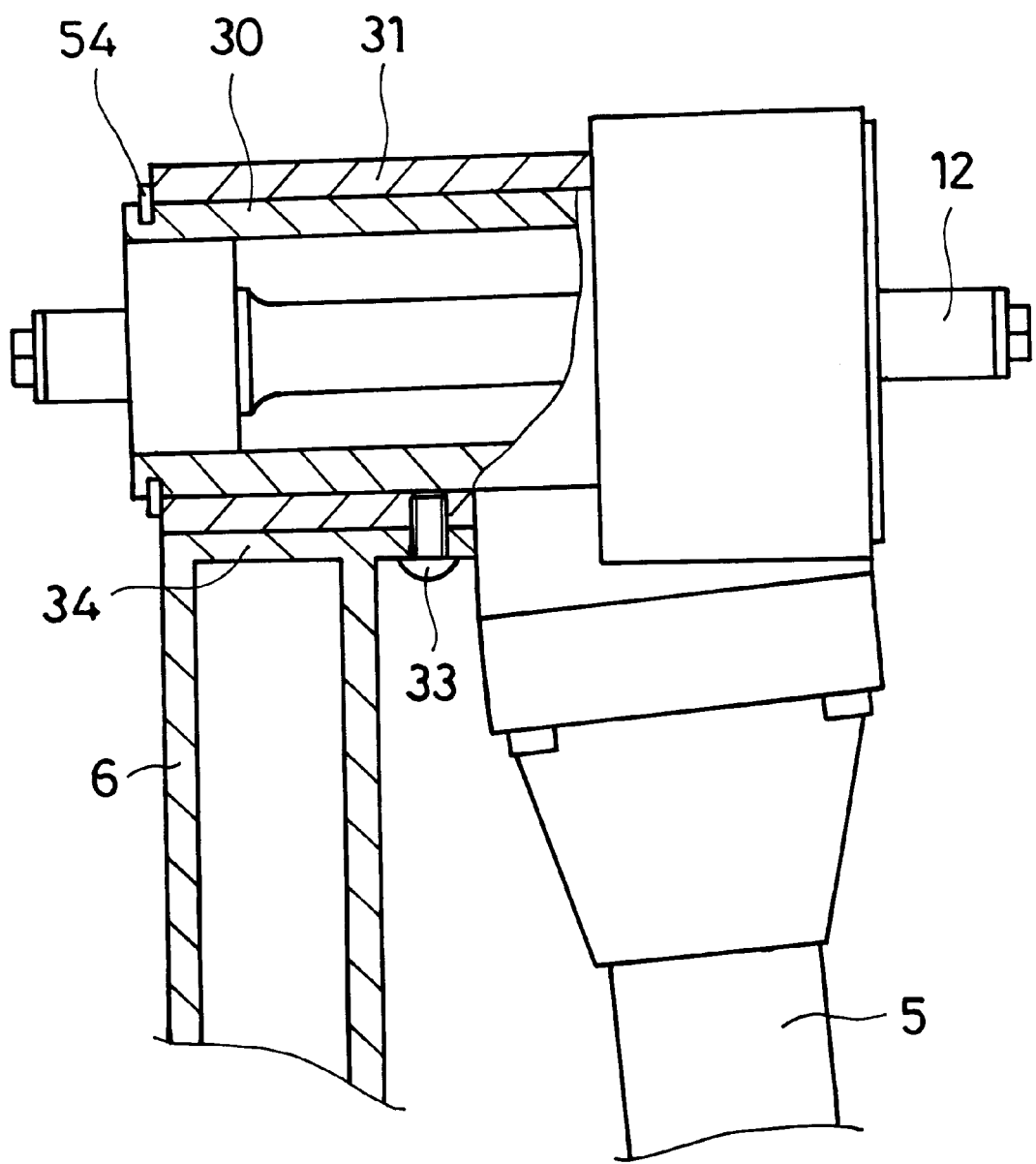
FIG. 6 is a sectional view in an enlarged scale of a front part of the present invention, showing the first casing installed in the bottom bracket, the second stay fastened to the bottom bracket.
Figure 7A:
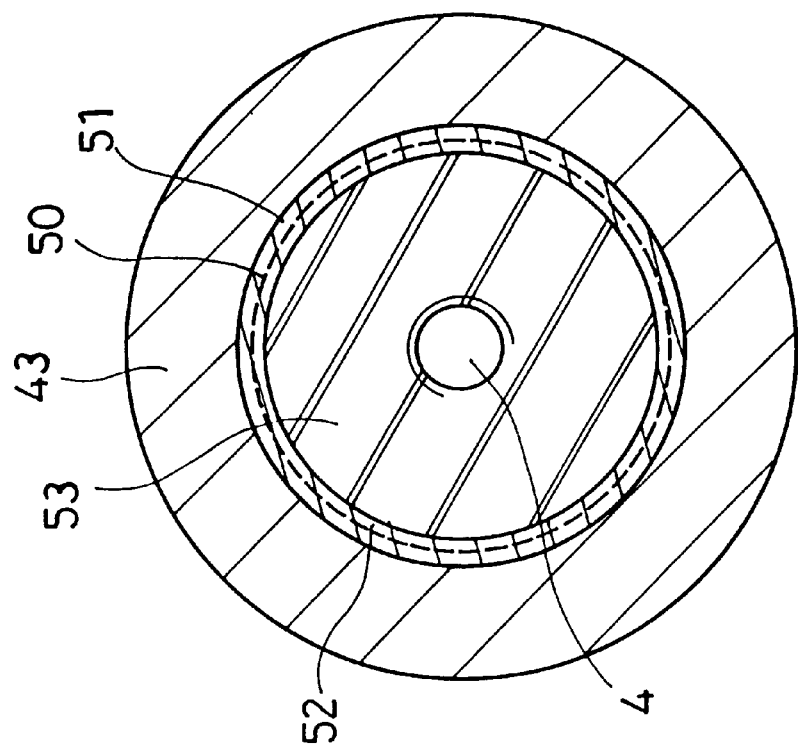
FIG. 7A is a sectional view taken along line A—A of FIG. 7.
Figure 7:
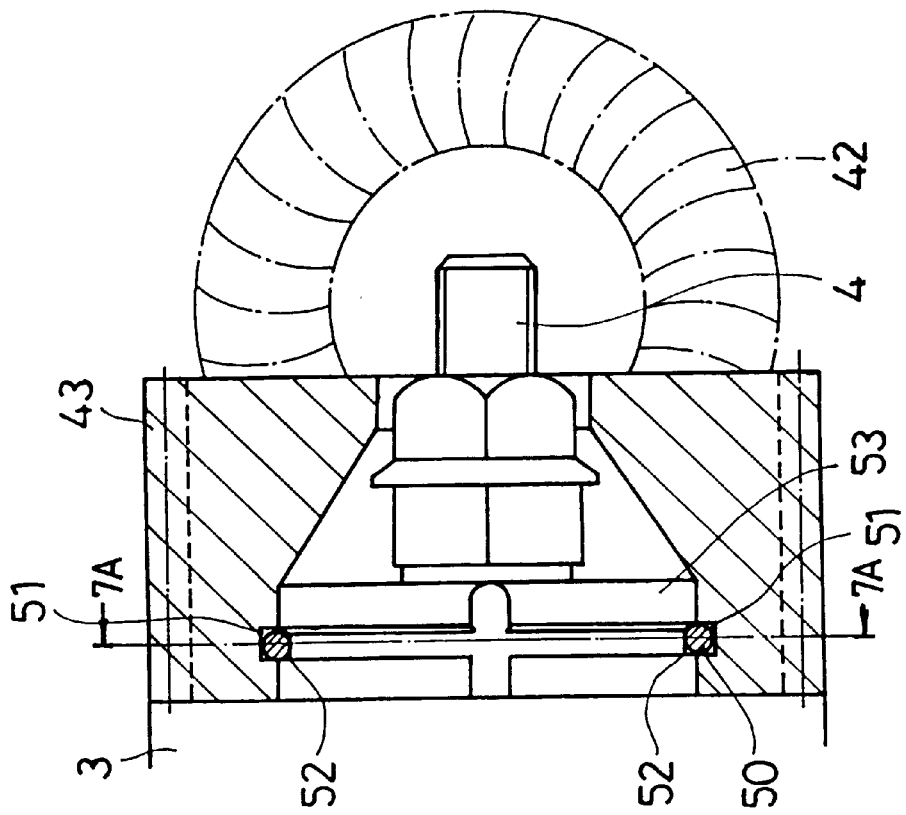
FIG. 7 is a sectional view in an enlarged scale of a rear part of the present invention, showing the second helical gear and the rear-wheel hub coupled together.

The first casing 30 has a cylindrical shape mounted in the bottom bracket 31 and secured in place by a clamp 54 (see also FIG. 6), having a hollow projecting block 35 raised from the periphery and facing the second casing 17. The bottom bracket 31 is welded to the bicycle frame 1, having a notch 36 which receives the hollow projecting block 35 of the first casing 30. The second stay 6 has an arched coupling plate 34 at one end for close-fitting over the periphery of the bottom bracket 31. Screw holes 32 are respectively made on the arched coupling plate 34 and the bottom bracket 31, enabling the arched coupling plate 34 and the bottom bracket 31 to be fixedly fastened together by screws 33. A first helical gear 40 is fixedly mounted on the bottom bracket bearing axle 12. A second helical gear 43 is fixedly mounted on the axle 4 of the rear-wheel hub 3. A first helical spur gear 41 is fixedly mounted on the transmission shaft 7 at one end outside the first stay 5, and meshed with the first helical gear 40; a second helical spur gear 42 is fixedly mounted on the transmission shaft 7 at an opposite end outside the first stay 5, and meshed with the second helical gear 43 (see FIG. 5). The rear-wheel hub 3 comprises a cylindrical axle holder 53 which holds the axle 4 on the inside by lock nuts 55, and an outside annular coupling groove 52 around the axle holder 53. The second helical gear 43 comprises an inside annular coupling groove 51 disposed around the inside wall (see FIG. 3A). When the second helical gear 43 is mounted on the axle 4 of the rear-wheel hub 3, the outside annular coupling groove 52 and the inside annular coupling groove 51 are matched together and secured together by a binding ring 50 (see FIGS. 7 and 7A).

Figure 8:
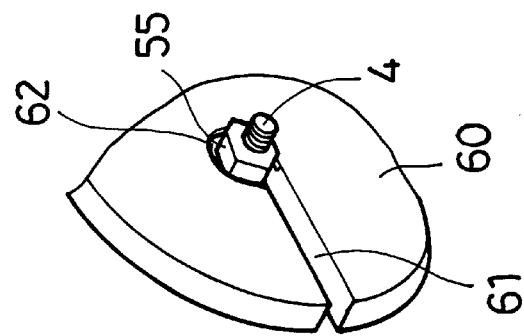
FIG. 8 is an enlarged view of a part of the present invention, showing the lock nut of the rear-wheel hub received in the circular center hole of the coupling plate of the second casing.

Referring to FIGS. 3, 4 and 8, the second stay 6 and the second casing 17 are respectively coupled to the rear-wheel hub 3 by the same mounting structure. This mounting structure comprises a flat coupling plate 60 having a circular center hole 62, and an elongated slot 61 extended from the circular center hole 62 to the periphery. The width of the elongated slot 61 is slightly greater than the diameter of the axle 4, but smaller than the diameter of the lock nut 55. When the flat coupling plate 60 is coupled to the rear-wheel hub 3, the circular center hole 62 receives one lock nut 55. Because the width of the elongated slot 61 is smaller than the diameter of the lock nut 55, the axle 4 is stopped from moving into the elongated slot 61.

While only one embodiment of the present invention has been shown and described, it will be understood that various modifications and changes could be made thereunto without departing from the spirit and scope of the invention disclosed.

What the invention claimed is:

1. A chainless transmission mechanism for a bicycle, comprising a first casing mounted in a through bore of a bottom bracket of the bicycle to support a bottom bracket bearing axle therein, a rear-wheel hub holding an axle, said axle being secured to said rear-wheel hub by a lock nut at each of two opposite ends thereof, a second casing coupled to said rear-wheel hub, a first stay connected between said first casing and said second casing, a second stay connected between said bottom bracket and said rear-wheel hub, a transmission shaft mounted in said first stay, a first transmission gear set coupled between said bottom bracket bearing axle and said transmission shaft, said first transmission gear set including a first helical gear coupled to said bottom bracket bearing axle and a first helical spur gear coupled to said transmission shaft and meshingly engaged with said first helical gear, and a second transmission gear set coupled between said transmission shaft and the axle of said rear-wheel hub, said second transmission gear set including a second helical gear coupled to said axle of said rear-wheel hub and a second helical spur gear coupled to said transmission shaft and meshingly engaged with said second helical gear, wherein said bottom bracket has a first end, a second end, and a notch at the second end thereof, said first casing having (a) a cylindrical shell inserted through said bottom bracket, (b) a first end secured to said bottom bracket outside the first end of said bottom bracket by a clamp, (c) a second end disposed outside the second end of said bottom bracket, and (d) a hollow projecting block raised form the second end of said first casing and forced into engagement with the notch at the second end of said bottom bracket.

* * * * *